United States Patent [19]

Wallace et al.

[11] Patent Number: 4,948,981

[45] Date of Patent: Aug. 14, 1990

[54] PRIMARY MANWAY SHIELDING AND EXHAUST COVERS FOR A STEAM GENERATOR

[75] Inventors: Wayne R. Wallace, N. Huntingdon; Allan K. Immel, Irwin Boro, Westmoreland County; Warren E. Lester, II, Mt. Lebanon, all of Pa.

[73] Assignee: Westinghouse Electric Corp., Pittsburgh, Pa.

[21] Appl. No.: 325,747

[22] Filed: Mar. 20, 1989

[51] Int. Cl.$^5$ .............................................. G21C 11/02
[52] U.S. Cl. ............................. 250/517.1; 250/515.1; 376/287; 376/288; 376/272
[58] Field of Search ................ 250/517.1, 515.1, 512.1; 376/287, 288, 272

[56] References Cited

U.S. PATENT DOCUMENTS

| | | | |
|---|---|---|---|
| 4,200,172 | 4/1980 | Meuschke et al. | 250/517.1 |
| 4,439,905 | 4/1984 | Gourdon et al. | 376/272 |
| 4,729,869 | 3/1988 | Schukei et al. | 250/515.1 |
| 4,801,423 | 1/1989 | Warren et al. | 250/515.1 |
| 4,833,335 | 5/1989 | McGinley et al. | 250/517.1 |

OTHER PUBLICATIONS

Installation manual entitled "Radiation-Reducing Doors for Steam Generator Maintenance Using an SM-10" Published by Combustion Engineering.

Primary Examiner—Janice A. Howell
Assistant Examiner—Kiet T. Nguyen

[57] ABSTRACT

Shielding and exhaust covers are disclosed herein which are mountable on the primary manways of a nuclear steam generator for protecting maintenance personnel from potentially harmful radiation during maintenance operations. Each of these doors includes mounting flanges which are detachably mountable to the manway flange. These mounting flanges include brackets for mounting a jewel rail track assembly which in turn slidably mounts two opposing quarter circle panels which, when slid together, form a semicircular shielding cover. The shielding and exhaust covers of the invention may be easily mounted over their respective manways by a single person, and may be opened or closed by a single person standing to the side of the manway and hence out of the radiation shine eminating therefrom. Finally, the shielding material contained in each of the covers is hermetically sealed within stainless sheet metal, which renders it mechanically strong and easily decontaminated.

37 Claims, 7 Drawing Sheets

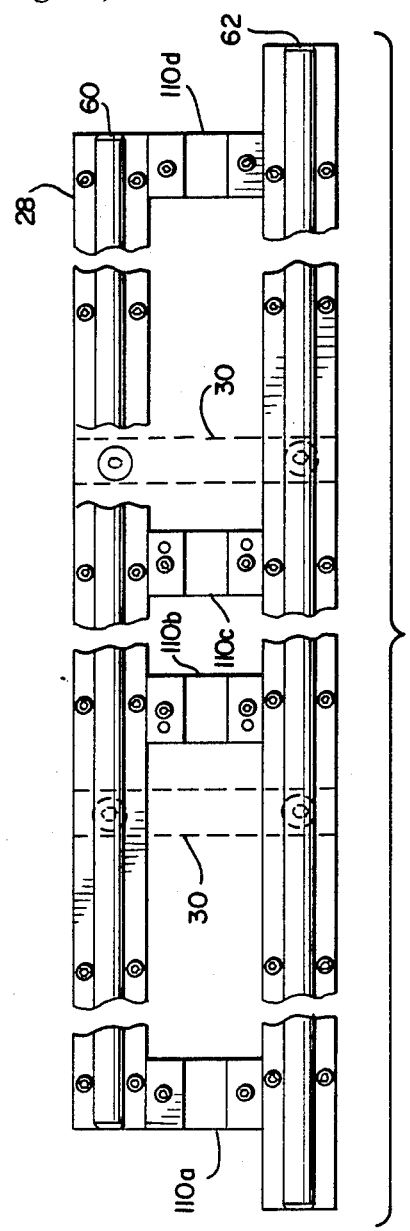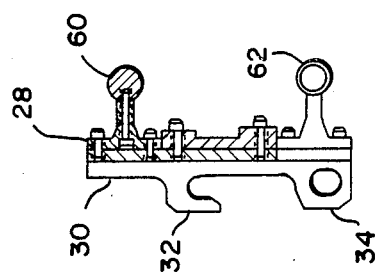

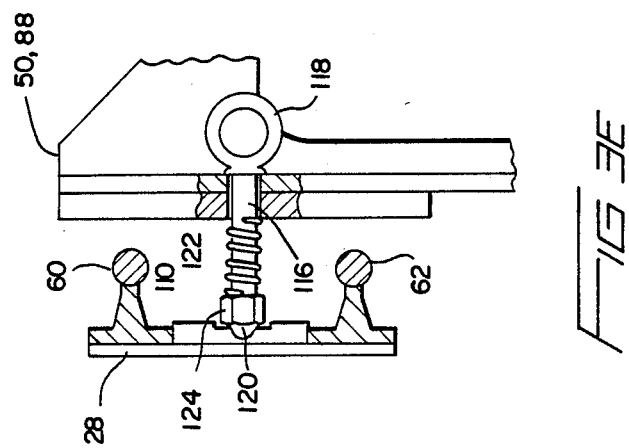
FIG 3E
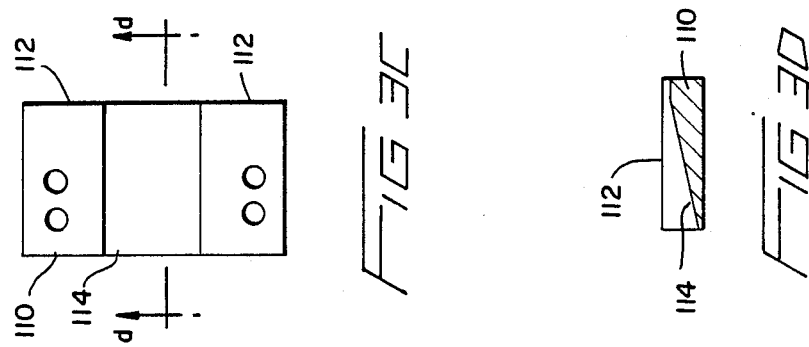
FIG 3C
FIG 3D

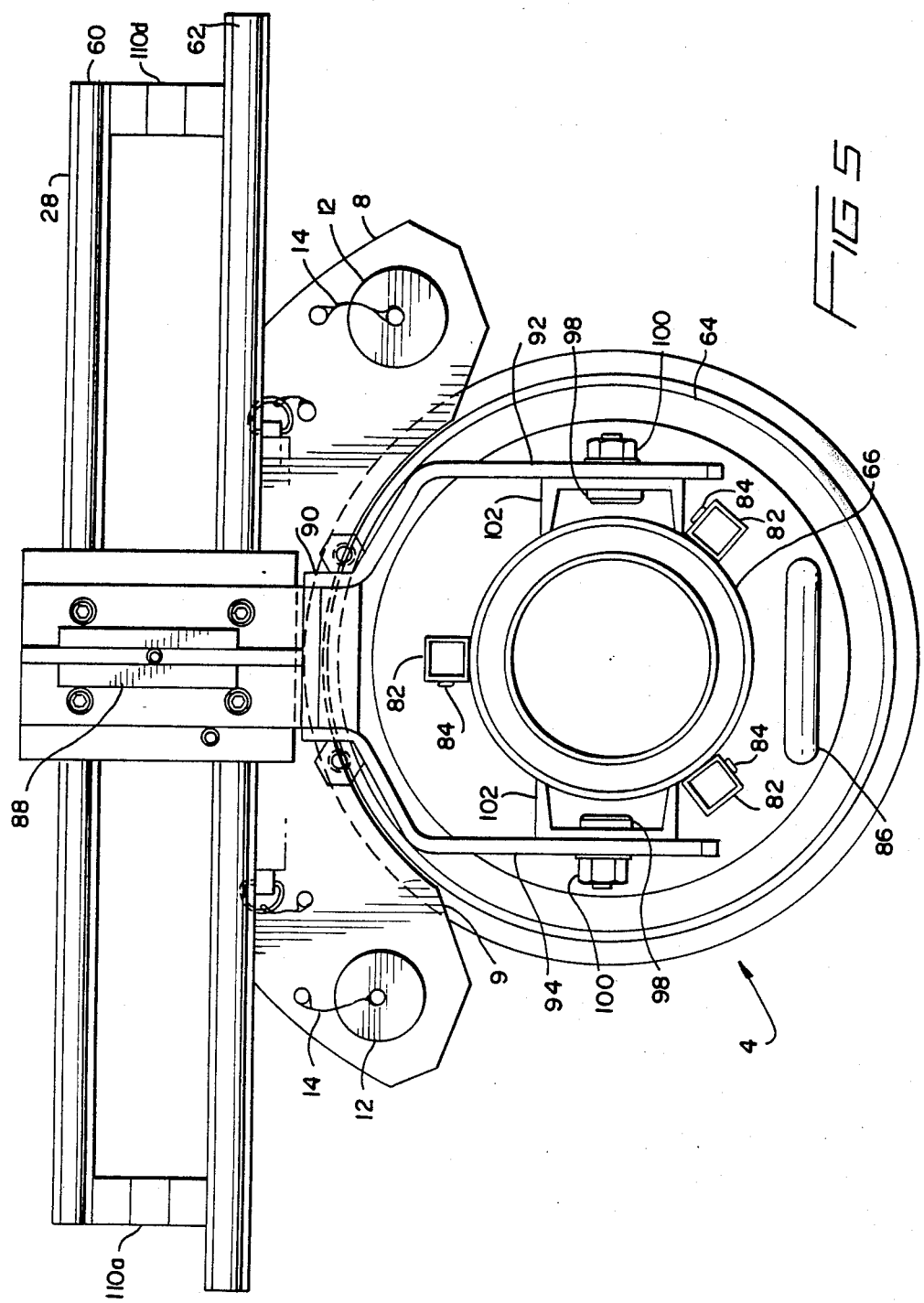

PRIMARY MANWAY SHIELDING AND EXHAUST COVERS FOR A STEAM GENERATOR

TECHNICAL FIELD

This invention relates to shielding doors and exhaust doors mountable on the primary manways of a nuclear steam generator for protecting maintenance personnel from potentially harmful radiation during maintenance operations.

BACKGROUND OF THE INVENTION

Various shielding and exhaust door configurations have been developed in the prior art for the purpose of minimizing the exposure of the maintenance personnel to potentially harmful radiation during maintenance operations. However, before the design objectives and shortcomings associated with such doors can be appreciated, some understanding of the general structure and operation of steam generators is necessary.

Nuclear steam generators are comprised of three principle parts, including a bowl-shaped primary side, a cylindrically shaped secondary side disposed over the primary side, and a tube sheet disposed between the primary and the secondary sides. The secondary side contains a bundle of U-shaped heat exchanger tubes, the ends of which are mounted within the tube sheet. The tube sheet and the U-shaped heat exchanger tubes hydraulically isolate the primary side from the secondary side of the steam generator while thermally connecting them together, so that heat from radioactive water circulating through the primary side may be transferred to non-radioactive water present in the secondary side in order to generate non-radioactive steam. The bowl-shaped vessel of the primary side is known as the channel head of the steam generator.

During the life of the steam generator, the heat exchanger tubes channel head may become corroded or damaged, thereby necessitating various inspections and repairs. These repairs are accomplished by a succession of tools which are remotely manipulated within the channel head. Access to the interior of the channel head is gained through manways on both the inlet and the outlet sides of the channel head. Each of the manways is circular in shape, and is surrounded by circumferential flange. When the steam generator is in operation, a hatch cover is sealingly attached over the manway flange by a plurality of uniformly spaced bolts that screw into bolt holes present in the flange. When repairs are necessary, the steam generator is taken offline and drained, and the hatch cover over each of the manways is removed to provide access for the repair tools. Because of the exposure of the channel head and the heat exchanger tubes to radioactive water, these components have likewise become radioactive. Consequently, radiation "shines" out of the manways after their respective hatch covers are removed. To reduce the amount of radiation exposure that the maintenance personnel receive from the radiation emitted through the manways, a set of lead-lined radiation reducing doors can be provided on both the inlet and the outlet manways.

In one prior art design, both a radiation reducing entry door and a ventilation door are provided for both the inlet and the outlet manways. Each of these doors includes a flange mounting assembly that is detachably mountable to the bolt holes present in the flange which circumscribes the manways. The mounting assembly of each door consists of a half flange with mounting bolts large enough to be easily grasped by maintenance personnel wearing rubber gloves. These mounting bolts are suspended from the flanges by flexible cables so that the mounting bolts are easily accessible by the maintenance personnel when the time comes to manually screw them into the bolt holes of the manway flange. Each of the mounting assemblies also includes a hinge bracket detachably connectable by hinge pins to either the entry door or the ventilation door in order to obviate the removal and replacement of the mounting assemblies when it is desired to switch the ventilation and entry doors.

The radiation reducing entry door of this prior art design is semi-circular in configuration and weighs approximately forty pounds. While it is possible for one person to lift the door into position on the hinged bracket, such an operation requires the person to stand directly in front of the manway opening hence directly in the shine of radiation emanating therefrom. Since both the inlet manway and the outlet manway extend downwardly from the exterior wall of the channel head at an angle of 45 degrees relative to the horizontal, the entry door must be locked in both the open and closed positions since gravity tends to pull the door away from the manway. To lock the door in the fully opened condition, a ball lock pin must be inserted in aligned holes present in the hinged bracket and the door brackets. Again, this requires maintenance personnel to stand directly in the shine of the open manway to lift and position the entry door during insertion of the ball lock pin. Due to the heavy weight of the door, it is difficult for one person to swing the door to the completely open position and lock it in place. Therefore, two persons are required for this operation and each of these persons will be subjected to radiation emitted through the open manway. Likewise, two persons are required to lock the doors in the closed condition.

Similarly, the ventilation door of the prior art is provided with a hook shaped bracket which, during mounting, must be positioned over a bar extending between the hinged brackets on the top of the mounting assembly. In practice, this door weighs approximately seventy pounds and requires two persons to position it for mounting. Once this door is mounted on the hinged brackets, the door is pushed up against the manway flange and secured at its lower portion tightly against the manway flange by mounting bolts having large washers. The ventilation door includes a central opening having an eight inch diameter exhaust nozzle that extends away from its outer wall, while the inner wall is covered by a lead plate that is spaced from the opening to provide radiation shielding without interfering with the air flow through the nozzle.

Once these doors are in place, access may be gained through the lower portion of the inlet manway with radiation exposure being limited by the lead shielding in the entry door. Additionally, a vacuum is drawn through the nozzle in the ventilation door to draw air through the steam generator and out the ventilation door to remove airborne radioactive particulates from the interior of the steam generator. The lower portion of the inlet manway is adapted to receive servicing devices such as the SM-10 robotic arm supplied by Zetec of Isaquah, Washington as modified by the Westinghouse Electric Corporation. Often these servicing devices include a number of secondary manipulating devices. These secondary devices, such as the D-4 probe pusher manufactured by Echoram Technology, a Westinghouse subsidiary, are mounted on the trunk of the SM-10 robotic arm at the manway opening. When so mounted, the probe pusher extends upwardly from the trunk of the SM-10 and blocks the hinged movement of the entrance door. This requires the D-4 probe pusher to be removed each time the entrance door is required to be opened or removed, which in turn exposes the maintenance personnel to additional radiation.

Since the above-mentioned prior art entry door and ventilation door require the operator to stand directly in front of the open manway during the positioning, mounting, opening and closing of the doors, the operator is subjected to substantial amounts of potentially harmful radiation. Furthermore, these doors are formed of a laminate of lead shielding riveted between two sheets of stainless steel which is easily damaged from mechanical shock which might occur if the doors are dropped, and which also provides crevices for radioactive particles to accumulate. Finally, the size and weight of these doors makes this difficult to position and mount by a single person. Clearly, the need has arisen for entry and ventilation doors for manways which may be easily positioned and mounted on the manway flange by a single person, and that are easily opened and closed by a single person without subjecting that person to radiation exposure. Ideally, such doors should withstand mechanical shock without damage, be easily decontaminated, and easily interchanged between the inlet manway and the outlet manway. Finally, such doors should not mechanically interfere with the operation of standard maintenance tooling.

SUMMARY OF THE INVENTION

Generally speaking, the present invention is directed towards shielding and exhaust doors or covers for the primary manways of a nuclear steam generator which overcome the shortcomings of the prior art. Each of these covers includes interchangeable mounting flanges having brackets for mounting a dual rail track assembly. These mounting flanges are provided in the form of arched plates having through-holes alignable with the threaded holes of the manway flange. These mounting flanges, once positioned, may remain in place and can interchangeably accommodate either the shielding or exhaust covers. The brackets formed on the mounting flange also include through-holes for receiving stabilizing pins that secure the dual rail track in position on the mounting flange. Both the shielding or exhaust covers are adapted to readily receive the dual rail track so as to be slidably movable from an open position to a closed position, and to allow for ease in the initial positioning of the covers. Additionally, each of the shielding and exhaust covers is provided with a handle that includes a carriage assembly so that the handles may be easily positioned on the rails. These handles advantageously allow the operator to grasp and move the shielding or exhaust cover while being positioned along side the manway and away from the shine of radiation emitted directly out of the front of such manway.

The shielding cover, in accordance with the present invention, may be formed from two opposing quarter circle panels which, when slid together, form a semicircular shielding cover. Each of these quarter circle panels includes its own handle and carriage assembly such that the quarter panels may be slid away from one another to open the manway and towards one another to cover the manway. The exhaust cover is similiarly mountable to the dual rail track to render the exhaust door over the manway from an open position to a closed position where a flange of the exhaust cover can sealingly engage the primary flange of the manway. On its outer side, the exhaust cover includes a central opening with a nozzle extending outwardly from the cover. A shielding plate is positioned on the inner side of the exhaust cover and spaced a distance away from the exhaust cover so as to allow air to pass therebetween and out of the nozzle. This shielding plate is retractable so that it can be drawn inwardly towards the inner side of the exhaust cover to allow the exhaust cover to slide freely between the open and closed positions.

It is an object of the present invention to provide shielding and exhaust covers for the primary manways of the nuclear steam generator which may be easily installed and operated by a single operator.

Another object of the present invention is to provide a universal mounting flange such that the shielding and exhaust covers may be easily interchanged on the same manways.

Yet another advantage of the present invention is that the opening, closing and positioning of the shielding and exhaust covers may be accomplished easily by an operator standing to the side of the open manway of the steam generator. This will significantly reduce the amount of potentially harmful radiation to which the operator is exposed.

A further object of the present invention is to provide shielding and exhaust covers having a hermetically sealed construction to aid in the handling of the covers, the decontaminating of the covers, and overall strength of the covers, while providing the covers with increased protection capabilities.

Another object of the present invention is to provide shielding covers which are easily moved between the open closed positions without interfering with the servicing devices employed within the manway, and which allow the shielding covers to be opened and closed without removing any portion of servicing devices.

These advantages, as well as others, will become apparent from the detailed description of the preferred embodiment and with reference to the several figures.

BRIEF DESCRIPTION OF THE DRAWINGS

FIG. 3A is an elevational view of the dual rail track used in conjunction with the preferred embodiment of the invention.

FIG. 3B is a side view of the dual rail track shown in FIG. 3A.

FIG. 3C is a portion of the dual rail track shown in FIG. 3A.

FIG. 3D is cross section of FIG. 3A taken along line D—D.

FIG. 3E is a cross section taken along line E—E of FIG. 1.

FIG. 5 is an elevational view of the exhaust cover in accordance with a preferred embodiment of the invention.

DETAILED DESCRIPTION OF THE PREFERRED EMBODIMENT

Figure 1:
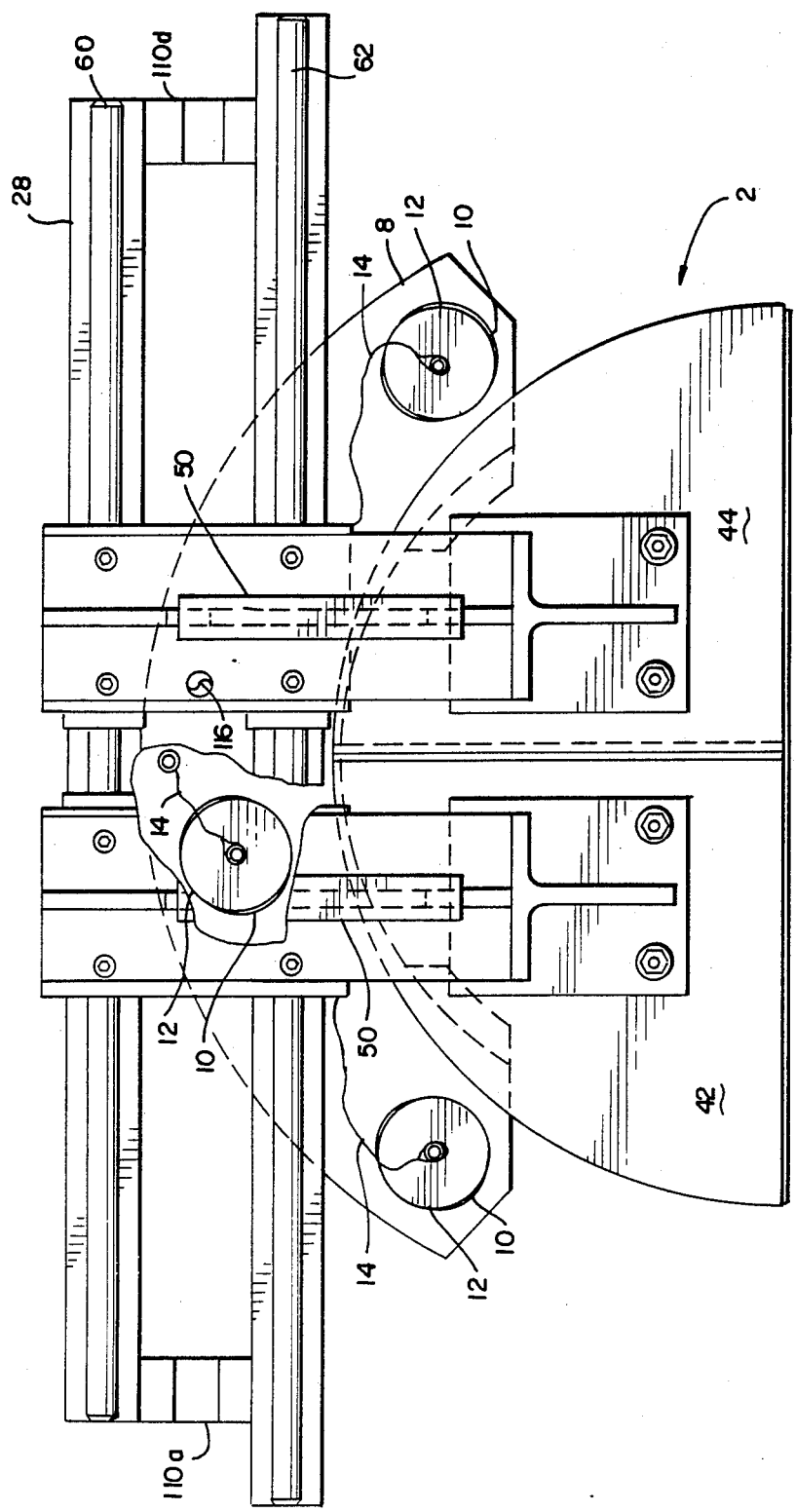
FIG. 1 is an elevational view of the shielding covers in accordance with a preferred embodiment of the invention shown in their closed position.

FIGS. 1 and 5 of the drawings illustrates the shielding cover 2 and the exhaust cover 4 which are provided to cover the inlet and outlet manways of the steam generator so as to reduce radiation emissions therefrom and protect maintenance personnel. Each of the shielding cover 2 and the exhaust cover 4 includes a universal mounting assembly 6 such that the covers may be interchangeably mounted between the inlet and outlet manways of the steam generator.

Figure 2:
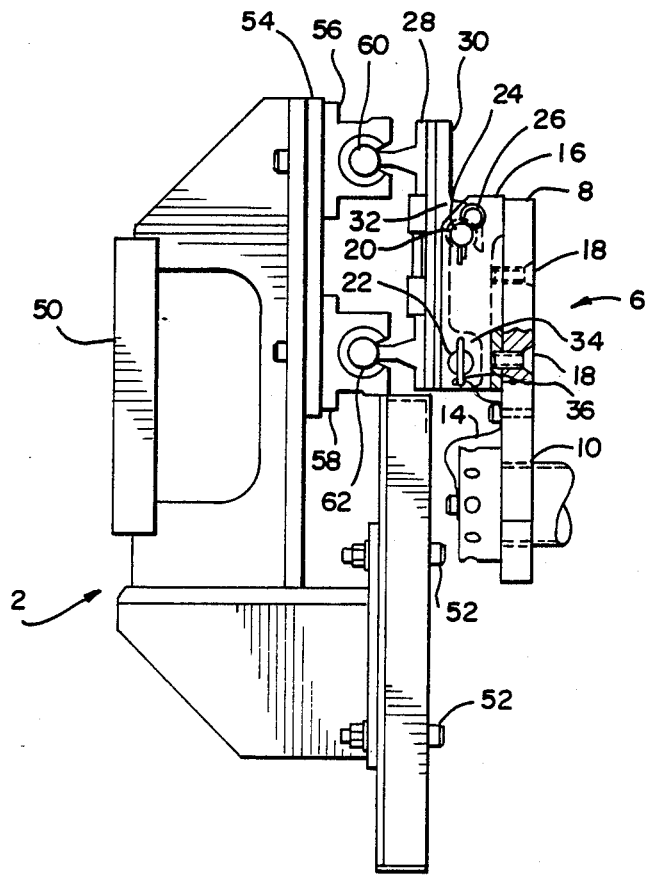
FIG. 2 is a side view of the shielding covers shown in FIG. 1.
Figure 4A:
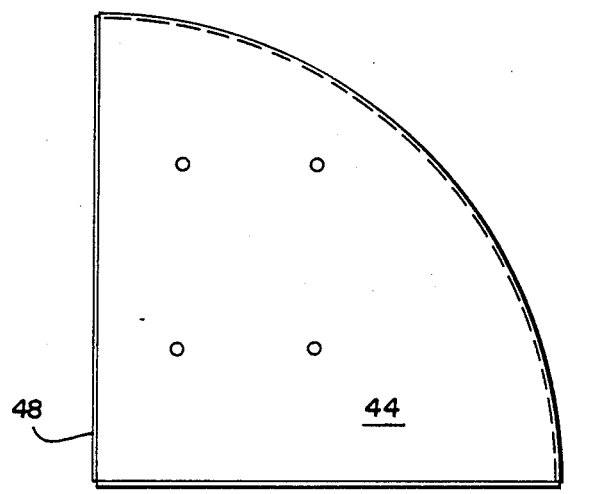
FIG. 4A is an elevational view of one of the quarter circle shielding panels in accordance with a preferred embodiment of the invention.
Figure 4B:
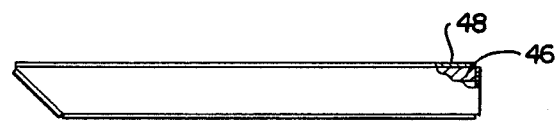
FIG. 4B is a side partial cross section view of the quarter circle shielding panel of FIG. 4A.
Figure 6:
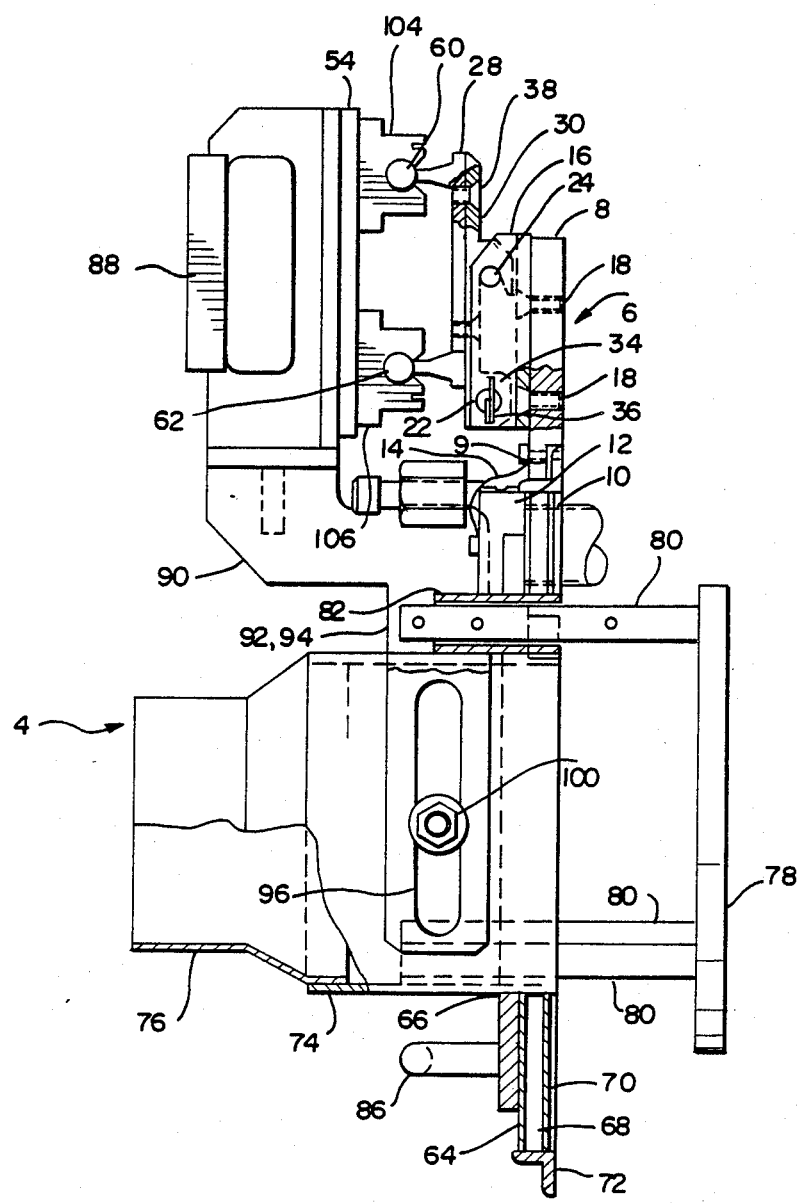
FIG. 6 is a side view of the exhaust cover shown in FIG. 5.

As is shown in FIGS. 1, 2, 5 and 6, the universal mounting assembly 6 includes an arched shaped mounting flange 8 having a plurality of through-holes 10 which are spaced apart a predetermined distance so that they will match the threaded through-holes provided in the primary flange of the manway (not shown). The flange also includes the undercut 9 in its lower portion which will be described in further detail hereinafter. Once the mounting flange 8 is aligned, the mounting bolts 12 may be inserted through the holes 10 of the mounting flange 8 and threadingly engage the holes provided in the primary flange of the manway. These mounting bolts 12 are attached to the mounting flanges 8 by way of cables 14 and are large enough to be easily grasped by an operator wearing rubber gloves so that the operator can readily grasp and insert the mounting bolts 12 in the through-holes of the primary flange of the manway to secure the mounting flange 8 to the primary flange of the manway. The mounting flange 8 further includes a mounting bracket 16 provided in an upper central portion of the mounting flange and secured thereto by screws 18. In a preferred embodiment of the invention, the mounting flange 8 is provided with two such mounting brackets 16. Each of these mounting brackets 16 include a pair of through-holes 20 and 22, one being located in an upper portion of mounting bracket 16 and one being located in a lower portion of the mounting bracket 16. The upper through-holes 20 are provided with a pin 24 which may be secured in place by a cotter pin 26. Once the pins 24 have been secured in place, the dual rail track 28 may be mounted in place thereon. The dual rail track 28 is of a conventional, commercially available type. The dual rail track 28 is provided with a pair of hook and pin brackets 30 as shown by phantom lines in FIG. 3A. The hook and pin brackets 30, as best seen in FIG. 3B, include a hook 32 provided on an upper portion of the hook and pin bracket 30 and a lower through-hole portion 34 for receiving a locking pin 36. As is shown in FIGS. 2 and 6, the hook and pin bracket 30 is secured to the dual rail track 28 by way of screws 38 such that the hook 32 can be positioned over and rest on the pin 24 provided in the mounting bracket 16. Once the hook 32 is positioned over the pin 24, the dual rail track 28 and hook and pin brackets 30 may be lowered such that the through-hole 34 aligns with the through-hole 22 in a lower portion of the mounting bracket 16. Once these holes are aligned, the locking pin 36 may be inserted therethrough to securely fasten the dual rail track 28 to the mounting flange 8. All of the above procedures may be easily accomplished by a single maintenance person, and done so from the side of the manway out of the shine of any radiation emission.

The above described mounting assembly 6 is identical and universal for both the shielding cover 2 and the exhaust cover 4. By providing such a universal mounting assembly, the shielding cover 2 and exhaust cover 4 may be interchanged without having to remove and replace the various mounting assemblies. Such interchangeability significantly reduces the amount of radiation emissions to which the operator is exposed because the mounting of the assembly 6 need only be performed once for both covers 2, 4.

Turning to FIGS. 1–4, the shielding cover 2 will now be described in detail. The shielding cover 2 is formed from a pair of quarter circle shielding panels 42 and 44. Each of these shielding panels 42, 44 is formed from a lead core 46 and an outer aluminum casing 48 which hermetically seals the lead core 46 to form a strong unitary construction. This unitary construction will facilitate decontamination of the shielding cover as well as limit damage to the cover should it be subjected to mechanical shock. Because the shielding cover 2 is formed from a pair of quarter circle shielding panels 42 and 44, each of these panels may be approximately one inch thick as composed to the one-half inch thick shielding cover of the prior art without adding to the weight of the door unit which the operator must handle. The environment in which the door is to be used as well as the requirements of the user will dictate the actual thickness and weight of the shielding cover 2. For example, a shielding cover having a lead core thickness of ¼ inch will weight approximately 20 pounds per quarter circle panel with each additional ¼ inch equalling approximately 10 pounds as shown in table below:

| Thickness of Cover in Inches | Weight of Cover in Pounds |
| --- | --- |
| ¼ | 20 |
| ½ | 30 |
| ¾ | 40 |
| 1 | 50 |

Each of the quarter circle shielding panels 42 and 4 are secured to a handle portion 50 as shown in FIG. 2. Bolts 52 are provided for this purpose. The upper portion of the handle 50 is first secured to a carriage assembly 54 in a similar manner. The carriage assembly 54 (manufactured by Thomson, Inc.) includes upper and lower rail guides 56 and 58, respectively. The upper rail guide 56 slidingly receives the upper rail 60 of the dual rail track 28, while the lower rail guide 58 slidingly receives the lower rail 62 of the dual rail track 28.

As can be seen in FIGS. 5 and 6, the exhaust cover is mounted on a mounting assembly identical 6 to that provided for the shielding cover 2. The exhaust cover is formed from a circular plate 64 having a central opening 66 therethrough. The circular plate 64 has a similar construction to that of the shielding cover 2. The circular plate consists of an inner lead core 68 and an outer aluminum casing 70 which is hermetically sealed about the lead core 68. The outer periphery of the circular plate 64 is further provided with the flange 72. This flange 72 is secured beneath the undercut 9 formed in the mounting flange 8 so as to form a seal with the primary flange of the manway. A central opening 66 is provided in the circular plate 64 so as to accommodate a nozzle 74. This nozzle 74 may be provided with an adapter 76 to allow the nozzle to be received within exhaust tubing (not shown) of various sizes.

The exhaust cover 4 is provided with a shielding plate 78 which includes legs 80 that extend through guides 82 provided in the circular plate so that the spacing between the circular plate and the shielding plate may be adjusted and so that the shielding plate may be completely retracted towards the circular plate during the opening and closing of the exhaust cover. Each guide 82 is provided with a set screw 84 in order to secure the shielding plate in the desired position. The exhaust cover 4 further has a pair of handles 86 and 88 to aid in the positioning, handling, and opening and closing of the exhaust cover 4. The handle 86 is provided in the form of a U-shaped rod connected to a lower portion of the circular plate 64, while the upper handle 88 is of a form similar to that utilized in conjunction with shielding cover 2.

The exhaust cover 4 may be adjustably mounted with respect to the upper handle 88. As is shown in FIGS. 5 and 6, a bracket 90 extends downwardly from the handle 88 and includes two extending leg portions 92 and 94. Each of these leg portions include an elongated slot 96 that accommodates an adjustment bolt 98 and an adjustment nut 100. The adjustment bolt 98 further extends through a bracket 102 which is secured to an outer portion of the nozzle 74.

Again, the upper handle 88 is similar to that handle 50 disclosed in connection with the shielding cover 2. The upper handle 88 is secured to a carriage assembly 54' identical to the carriage assembly 54 secured to the handle 50 of the shielding door 2. This carriage assembly 54' includes upper and lower rail guides 104 and 106, respectively. The upper rail guide slidingly receives the upper rail 60 and the lower rail guide 106 slidingly receives the lower rail 62 so that the exhaust cover 4 may be easily moved between an opened and closed position.

In operation, the upper rail guide 104 and lower rail guide 106 are aligned with and slid onto the upper and lower rails 60 and 62. At this point, the shielding plate 78 is fully retracted towards the circular plate 64, and the circular plate 64 is positioned in the lowermost extremity of the elongated slot 96. This will allow for the flange 72 to be easily positioned below the undercut 9 in the mounting flange 8. Once the exhaust cover 4 is positioned directly in front of the manway, the circle plate 64 is raised by pushing upwardly on the lower handle 86 so as to engage the flange 72 beneath the undercut 9 as is shown in FIG. 6. With the circular plate 64 being held in this position, the adjustment nut 98 can be tightened to maintain the circular plate 64 in this desired position.

As can be noted from FIGS. 1, 3a and 5, the lower rail 62 of the dual rail track 28 is longer than the upper rail 60. This is done so as to ease the initial positioning of the shielding cover 2 or the exhaust cover 4. It should also be noted that the rails of the dual rail track 28 each extend beyond the opening of the manway on both the right and left sides thereof. This will ensure that the operator can stand to the side of the opening and well out of the shine of any radiation emitted from within the channel head. While the several figures illustrate the rails extending to both sides of the opening, it is possible to extend them to only one side. Likewise, while the several figure illustrate the bottom rail 62 as extending beyond the top rail 60, the reverse would suit the identical purpose.

Turning now to FIGS. 3C, 3D and 3E, the mounting plate 8 includes a plurality of through-holes 10 that are spaced the same distance as the threaded holes provided in the primary flange of the manway so that the two sets of holes are registrable. However, when the mounting flange 8 is positioned on and secured to the primary flange of the manway, the mounting brackets 16 may not and often do not extend perpendicular relative to the horizontal. Because the rail guides 56 and 58 of the carriage assembly 54 include a clearance about the rails, the shielding and exhaust covers 2. 4 could slide due to gravity if no provision to the contrary were made and eithr slip entirely off the end of the dual rail track 28 or slip far enough toward the end of the rail ineffectively shields the open manway. To protect against such an occurance, a stabilizing mechanism is provided on the dual rail track 28. As is shown in Figure 3a of the drawings, a plurality of inclines or ramps 110 $a$, $b$, $c$ and $d$ are provided at a center portion of the track 28. The two ramps 110$a$ and 110$b$ are inclined downwardly from a midpoint of the track 28 toward their respective end and ramps 110$c$ and 110$d$ are inclined in the opposite direction. FIGS. 3C and 3D illustrate a single ramp 110. Each ramp includes a pair of fastening surfaces 112 which allow the ramps to be secured to the track 28, and an inclined surface 114.

The handle portions 50 of the shielding cover 2 and portion 88 of the exhaust cover 4 include spring biased locking pins 116. The pins 116 include a ring portion 118 at one end thereof and a sliding member 120 at the other. A coil spring 122 is provided to bias the pin 116 into the extended position which will be described further below. A nut 124 is also provided to allow the force of the spring 122 to be adjusted.

When the covers 2, 4 are initially positioned on the dual rail track 28, the covers 2, 4 are slid to a position between ramp 110$a$ and 110$b$ (and 110$c$ and 110$d$ when the shielding covers are being placed on both ends of the track). In doing so, the sliding member 120 will ride up the incline 114 against the force of spring 122 and side back to the extended position once past the ramp 110$a$ or 110$d$. This will allow the cover to be left in this position without the fear of having the cover unintentionally fall off the end of the track 28. When the cover is desired to be put into position over the manway opening, it is further slid to the right or left and over incline 110$b$ or 110$c$. This will reliably maintain the cover in a position to effectively cover the manway opening. When the covers 2, 4 are required to be opened or removed, the ring porition 118 of the pin 116 is drawn outwardly against the force of spring 122 and the cover is free to slide to the right or left. Again, if it is desired to only open the covers and not remove them, once the sliding member has cleared the ramp 110$b$ or 110$c$ the pin 116 can be released which will maintain the cover on the respective side of the track 28.

All of the above manipulations are easily peformed by a single maintenance operator standing well to the side of the open manway.

By providing shielding and exhaust covers in the form of the above construction, the covers may be easily transported, lifted and installed without sacrificing any of the protection capabilities of the prior art. Furthermore, by providing the dual rail track arrangement, the doors may be opened and closed with ease without requiring the maintenance personnel to stand directly in front of the opened manway. This will allow for a significant reduction in manpower requirements.

Furthermore, by utilizing covers in accordance with the present invention, servicing devices can be easily positioned in front of the manway without encumbering the opening and closing of the covers.

While the invention has been described in detail and with reference to specific embodiments thereof, it will be apparent to one of ordinary skill in the art that various changes and modifications can be made therein without departing from the spirit and scope thereof.

We claim:

1. A radiation emission shielding cover in combination with a steam generator of a nuclear reactor for covering at least a portion of a manway of the steam generator for protecting an operator from radiation emission, said cover comprising;
   a plate;
   a mounting assembly including a mounting flange for securing said mounting assembly adjacent said manway of the steam generator and a mounting bracket;
   a slide means mounted on said mounting bracket adjacent said manway; and
   guide means mounted on said plate for receiving said slide means such that said plate can be moved from an open position adjacent said manway to a closed position over at least a portion of said manway.

2. The cover as defined in claim 1, wherein said mounting flange is secured to a primary flange of said manway.

3. The cover as defined in claim 2, wherein said mounting flange is an arched plate having through holes therein which match threaded bores in said primary flange, and said mounting flange is bolted to an upper portion of said primary flange.

4. The cover as defined in claim 1, wherein said slide means is a dual rail track and includes a hook and eye securing bracket which is received by said mounting bracket.

5. The cover as defined in claim 4, wherein said mounting bracket includes a pin for supporting a hook of said hook and eye securing bracket and a through hole for aligning with an eye of said hook and eye securing bracket to receive a locking pin therein to secure said securing bracket within said mounting bracket.

6. The cover as defined in claim 1, wherein said plate is in the form of a half circle.

7. The cover as defined in claim 6, wherein said half circle is formed of two quarter circle plates each having separate guide means, and said quarter circle plates may be moved in opposite directions along said slide means to cover and uncover said manway.

8. The cover as defined in claim 7, wherein each of said quarter circles are approximately one inch in thickness and are formed of a lead core having an aluminum casing hermetically sealed therearound.

9. The cover as defined n claim 1, wherein said guide means includes a handle for aiding in the manipulation of said cover.

10. The cover as defined in claim 1, wherein said cover is an exhaust cover and said plate is in the form of a whole circle having a central opening therein for accommodating an exhausting assembly.

11. The cover as defined in claim 10, wherein said exhausting assembly includes a nozzle extending from said exhaust cover outwardly from said central opening, and a shielding plate which is spacingly positioned a predetermined distance from said cover into said manway to be covered.

12. The cover as defined in claim 11, wherein said shielding plate is retractable with respect to said cover and is completely retracted when said cover is being moved along said slide means.

13. The cover as defined in claim 10, wherein said mounting flange further includes an undercut which circumscribes said manway, and said exhaust cover includes a circumferential flange which is engageable with said undercut when said exhaust cover is in said closed position.

14. The cover as defined in claim 13, wherein said exhaust cover includes means for permitting said plate to be raised and lowered relative to said guide means so as to allow said plate to be lowered during the movement of said cover and raised to position said circumferential flange beneath said undercut when said cover is in the closed position.

15. The cover as defined in claim 14, wherein said guide means includes a supporting bracket which supports said plate, and said means for permitting said plate to be raised and lowered includes an elongated slot formed in said supporting bracket for receiving a fastening means of said plate such that said plate can be secured to said supporting bracket in said raised position.

16. The cover as defined in claim 1, further comprising a stabilizing means for restricting the movement of said guide means said slide means.

17. The cover as defined in claim 16 wherein said slide means is a dual rail track having upper and lower parallel rails, said stabilizing means includes a plurality of inclined surfaces inclined downwardly from a midpoint of said rails towards the respective ends of said rails, and said guide means includes a positioning pin having an end portion spring biased in a direction perpendicular to said rails, such that said positioning pin is displaced against said spring bias by said inclined surfaces during movement from said open position to said closed position and said positioning pin stabilizes said cover in said closed position.

18. A radiation emission shielding cover for protecting an operator from radiation emission from a manway of a nuclear steam generator comprising;
   a plate in the form of a half circle;
   a mounting assembly including a mounting flange for securing mounting assembly to a primary flange of said manway, and a mounting bracket;
   a slide means mounted on said mounting bracket adjacent said manway; and
   guide means mounted on said plate for receiving said slide means such that said plate can be moved from an open position adjacent said manway to a closed position covering at least a portion of said manway.

19. The shielding cover as defined in claim 18, wherein said mounting flange is an arched plate having through holes therein which match threaded bores in said primary flange, and said mounting flange is bolted to an upper portion of said primary flange.

20. The shielding cover as defined in claim 18, wherein said slide means is a dual rail track and includes a hook and eye securing bracket which is received by said mounting bracket.

21. The shielding cover as defined in claim 20, wherein said mounting bracket includes a pin for supporting a hook of said hook and eye securing bracket and a through hole for aligning with an eye of said hook and eye securing bracket to receive a locking pin therein to secure said securing bracket within said mounting bracket.

22. The shielding cover as defined in claim 18, wherein said half circle is formed of two quarter circle plates each having separate guide means, and said quarter circle plates may be moved in opposite directions along said slide means to open and close said opening.

23. The shielding cover as defined in claim 22, wherein each of said quarter circles are approximately one inch in thickness and are formed of a lead core having an aluminum casing hermetically sealed therearound.

24. The shielding cover as defined in claim 18, wherein said guide means includes handle for ease in manipulation of said cover.

25. The cover as defined in claim 18, further comprising a stabilizing means for restricting the movement of said guide means on said slide means.

26. The cover as defined in claim 25 wherein said slide means is a dual rail track having upper and lower parallel rails, said stabilizing means includes a plurality of inclined surfaces inclined downwardly from a midpoint of said rails towards the respective ends of said rails, and said guide means includes a positioning pin having an end portion spring biased in a direction perpendicular to said rails, such that said positioning pin is displaced against said spring bias by said inclined surfaces during movement from said open position to said closed position and said positioning pin stabilizes said cover in said closed position.

27. An exhaust cover in combination with a steam generator of a nuclear reactor for protecting an operator from radiation emission from a manway of said steam generator and for removing airborne particulates from within said steam generator, said exhaust cover comprising;
   a plate in the form of a whole circle having a central opening therein for accommodating an exhausting assembly;
   a mounting assembly including a mounting flange for securing said mounting assembly to a primary flange of said manway, and a mounting bracket;
   a slide means mounted on said mounting bracket adjacent said manway; and
   guide means mounted on said plate for receiving said slide means such that said plate can be moved from an open adjacent said manway to a closed position covering said manway.

28. The exhaust cover as defined in claim 27, wherein said mounting flange is an arched plate having through holes therein which match threaded bores in said primary flange, and said mounting flange is bolted to an upper portion of said primary flange.

29. The exhaust cover as defined in claim 27, wherein said slide means is a dual rail track and includes a hook and eye securing bracket which is received by said mounting bracket.

30. The exhaust cover as defined in claim 29, wherein said mounting bracket includes a pin for supporting a hook of said hook and eye securing bracket and a through hole for aligning with an eye of said hook and eye securing bracket to receive a locking pin therein to secure said securing bracket within said mounting bracket.

31. The exhaust cover as defined in claim 27, wherein said guide means includes handle for ease in manipulation of said cover.

32. The exhaust cover as defined in claim 27, wherein said exhausting assembly includes a nozzle extending from said exhaust cover outwardly from said central opening, and a shielding plate which is spacingly positioned a predetermined distance from said cover into said manway to be covered.

33. The exhaust cover as defined in claim 32, wherein said shielding plate is retractable with respect to said cover and is completely retracted when said cover is being moved along said slide means.

34. The exhaust cover as defined in claim 27, wherein said mounting flange further includes an undercut which circumscribes said manway, and said exhaust cover includes a circumferential flange which is engageable with said undercut when said exhaust cover is in said closed position.

35. The exhaust cover as defined in claim 34, wherein said exhaust cover includes means for permitting said plate to be raised and lowered relative to said guide means so as to allow said plate to be in a lowered position during the movement of said cover and raised to an upper position to engage said circumferential flange beneath said undercut when said cover is positioned over said manway.

36. The exhaust cover as defined in claim 35, wherein said guide means includes a supporting bracket which supports said plate, and said means for permitting said plate to be raised and lowered includes an elongated slot formed in said supporting bracket for receiving a fastening means of said plate such that said plate can be secured to said supporting bracket in said raised position.

37. A shielding and exhaust assembly for reducing the radiation exposure of maintenance personnel of a nuclear steam generator comprising;
   a pair of identical mounting assemblies each including a mounting flange for securing said respective mounting assembly to a primary flange of an inlet manway and an outlet manway of a steam generator, and mounting bracket;
   a pair of identical slide means mounted on said respective mounting brackets adjacent each of said respective manways;
   a shielding cover in the form of a half circle, and an exhaust cover in the form of a whole circle having a central opening therein for accommodating an exhaust assembly; and
   a pair of guide means mounted to each of said shielding cover and exhaust cover respectively for receiving said respective slide means such that said respective cover can be moved from an open position adjacent said respective manway to a closed position over said respective manway;
   wherein said shielding cover and exhaust cover are interchangeable and said pair of mounting assemblies and said pair of slide means remain in place on said respective manway flange when said shielding cover and said exhaust cover are interchanged.

* * * * *